M. E. SHINGLER.
SHOVEL.
APPLICATION FILED JAN. 29, 1921.
1,411,195.
Patented Mar. 28, 1922.
2 SHEETS—SHEET 1.
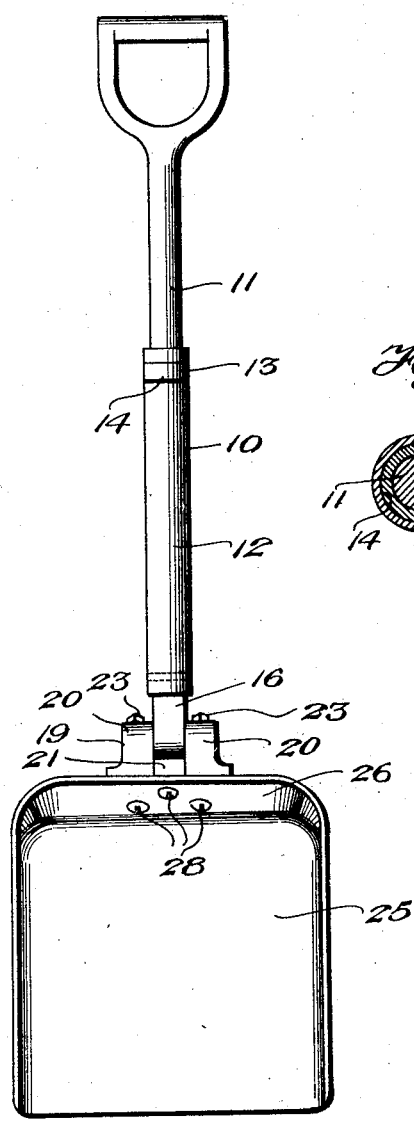
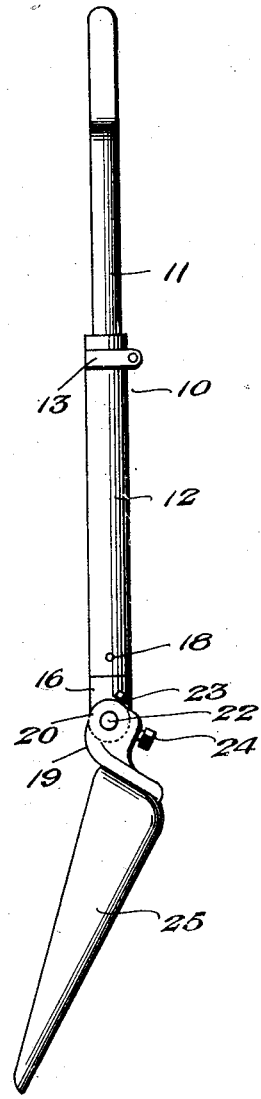
M. E. Shingler
INVENTOR
BY Victor J. Evans
ATTORNEY
WITNESS:

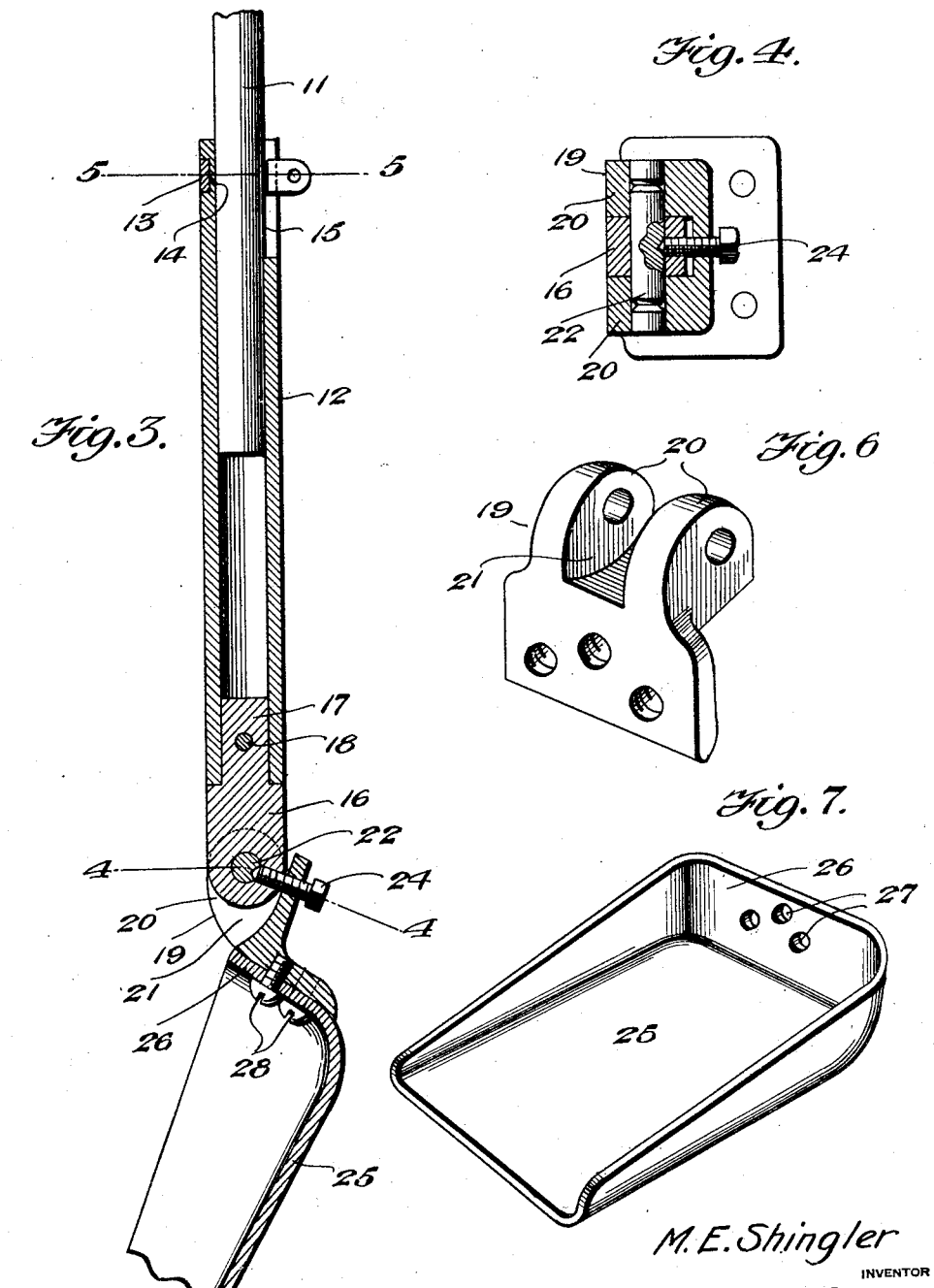

UNITED STATES PATENT OFFICE.

MILFORD E. SHINGLER, OF ASHVILLE, PENNSYLVANIA.

SHOVEL.

1,411,195.  Specification of Letters Patent.  Patented Mar. 28, 1922.

Application filed January 29, 1921. Serial No. 440,935.

*To all whom it may concern:*

Be it known that I, MILFORD E. SHINGLER, citizen of the United States of America, residing at Ashville, in the county of Cambria and State of Pennsylvania, have invented new and useful Improvements in Shovels, of which the following is a specification.

This invention relates to improvements in shovels and has for an object the provision of means for adjusting the shovel blade or scoop with respect to the handle to render the shovel more convenient to the user.

Another object is the provision of a shovel in which the blade or scoop is detachable from the handle to provide for interchanging the blades or scoops of different sizes or the substitution of a new blade should the one in use become worn or broken.

Another object is the provision of a shovel having an adjustable handle which may be quickly and easily regulated when desired.

Other objects and advantages of the invention will appear as the following description is read in connection with the accompanying drawings.

In the drawings:—

Fig. 1 is a front elevation of a shovel embodying the present invention.

Fig. 2 is a side elevation of the same.

Fig. 3 is a longitudinal sectional view.

Fig. 4 is a transverse section taken through the pivotal connection between the handle and blade.

Fig. 5 is a transverse section through the handle on the line with the adjusting clamp.

Fig. 6 is a detailed perspective view of the pivoted yoke.

Fig. 7 is a similar view of the blade or scoop.

Referring to the drawings in detail, wherein like characters of reference denote corresponding parts, the invention comprises a handle 10 which is composed of telescopic sections 11 and 12, the former being adjustable within the latter through the medium of a clamping band 13. This band is arranged transversely of the section 12 within an annular seat 14 and the section 12 is longitudinally split as shown at 15 so that its diameter may be reduced through adjustment of the clamp 13 to frictionally hold the handle sections 11 and 12 against relative movement.

The lower end of the handle section 12 has extending therefrom an apertured projection 16 which is formed with opposite flat surfaces and is provided with a shank 17 which extends within the lower end of the handle section 12. The shank 17 is provided with an opening which is adapted to register with openings formed at opposite sides of the handle section 12 for the reception of a bolt or pin 18.

Pivotally mounted upon the projection 16 is a yoke 19 which is provided with spaced ears 20. The space between these ears defines a groove 21 for the reception of the end of the projection 16. This projection is provided with a transverse opening which is adapted to register with openings provided in each of the ears 20. Passing through these openings in the ears 20 and the projection 16 is a pivot pin 22, the latter being held against movement within the openings of the ears 20 by means of adjusting screws 23, relative movement of the yoke 19 and the handle is regulated by means of an adjusting screw 24, which passes through an opening at the back of the yoke and engages the projection 16 of the handle.

The shovel blade or scoop which is shown at 25 may be of suitable size and shape, being provided with a flange 26 which connects the lower surface of the yoke 19 and this flange and yoke is provided with registering openings 27 for the passage of screws or bolts 28, the openings in the yoke being threaded for engagement with the threaded ends of the screws or bolts.

The invention is susceptible of various changes in its form, proportions and minor details of construction and the right is herein reserved to make such changes as properly fall within the scope of the appended claims.

Having described the invention what is claimed is:—

1. A shovel comprising a handle of sectional formation including a tubular section and a section telescopically adjustable within one end of the tubular section, means for holding the sections against relative movement, a plug secured within the opposite end of the tubular section and provided with a transverse opening therethrough, a blade, spaced apertured ears carried by the blade for position upon opposite sides of the apertured plug, a pivot pin extending through the openings in the plug and ears for pivotally securing the blade to the handle and adjusting screws extending through the ears and plug and engaging the pivot pin for holding the blade in adjusted position.

2. A shovel comprising a handle of sectional formation including a tubular section and a section telescopically adjustable within one end of the tubular section, means for holding the sections against relative movement, a plug secured within the opposite end of the tubular section and provided with a transverse opening therethrough, a blade, a yoke including an attaching flange, spaced apertured ears extending at right angles to said flange for position upon opposite sides of the apertured plug, means for removably securing the flange to the blade, a pivot pin extending through the openings in the plug and ears for pivotally securing the blade to the handle and adjusting screws extending through the ears and plug and engaging the pivot pin for holding the blade in adjusted position.

In testimony whereof I affix my signature.

MILFORD E. SHINGLER